United States Patent
Zhang et al.

(10) Patent No.: US 9,705,303 B2
(45) Date of Patent: Jul. 11, 2017

(54) HIGH VOLTAGE DIRECT CURRENT SOFT-START CIRCUIT

(71) Applicant: Huawei Technologies Co., Ltd., Shenzhen (CN)

(72) Inventors: Zhenxing Zhang, Shenzhen (CN); Jiansheng Xu, Shenzhen (CN); Nenghu Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 14/980,916

(22) Filed: Dec. 28, 2015

(65) Prior Publication Data

US 2016/0118782 A1 Apr. 28, 2016

Related U.S. Application Data

(63) Continuation of application No. PCT/CN2014/076861, filed on May 6, 2014.

(30) Foreign Application Priority Data

Nov. 29, 2013 (CN) .......................... 2013 1 0632606

(51) Int. Cl.
*H02H 9/08* (2006.01)
*H02H 1/00* (2006.01)
(Continued)

(52) U.S. Cl.
CPC .......... *H02H 1/0007* (2013.01); *H02H 9/001* (2013.01); *H02M 1/36* (2013.01);
(Continued)

(58) Field of Classification Search
USPC ...................................... 361/93.7–93.9, 93.1
See application file for complete search history.

(56) References Cited

U.S. PATENT DOCUMENTS

| 4,513,341 A | 4/1985 | Kollanyi |
| 5,077,675 A | 12/1991 | Tam |

(Continued)

FOREIGN PATENT DOCUMENTS

| CN | 101854051 A | 10/2010 |
| CN | 101882864 A | 11/2010 |

(Continued)

OTHER PUBLICATIONS

Partial English Translation and Abstract of Chinese Patent Application No. CN102455728, Jul. 31, 2015, 21 pages.
(Continued)

*Primary Examiner* — Danny Nguyen
(74) *Attorney, Agent, or Firm* — Conley Rose, P.C.

(57) ABSTRACT

A high voltage direct current soft-start circuit is provided in which a first end of a first switch is connected to a negative electrode of a high voltage direct current, a first end of a second switch is connected to the negative electrode of the high voltage direct current, and a drive control unit is connected separately to the first switch, the second switch, and a load, where a first part of a connector is connected to the drive control unit, and upon power-on, the first part of the connector communicates with a second part of the connector, to trigger the drive control unit to drive the first switch to turn on. The drive control unit delays a preset time after driving the first switch to turn on, drives the second switch to turn on, and drives the load to start after the second switch is turned on.

7 Claims, 7 Drawing Sheets

(51) Int. Cl.
*H02M 1/36* (2007.01)
*H02M 7/12* (2006.01)
*H02H 9/00* (2006.01)
H02H 9/02 (2006.01)
H02M 7/757 (2006.01)

(52) U.S. Cl.
CPC .......... *H02M 7/125* (2013.01); *H02H 9/025* (2013.01); *H02M 7/7575* (2013.01); *Y02E 60/60* (2013.01)

(56) References Cited

U.S. PATENT DOCUMENTS

| | | | |
|---|---|---|---|
| 5,635,823 A | 6/1997 | Murakami | |
| 6,781,502 B1* | 8/2004 | Robb | H02H 3/087 337/167 |
| 2005/0231874 A1* | 10/2005 | Hussein | H02H 9/001 361/93.1 |
| 2009/0021227 A1 | 1/2009 | Sase et al. | |
| 2011/0316509 A1 | 12/2011 | Chen et al. | |
| 2013/0286525 A1 | 10/2013 | Kanamori et al. | |

FOREIGN PATENT DOCUMENTS

| | | |
|---|---|---|
| CN | 102421231 A | 4/2012 |
| CN | 102455728 A | 5/2012 |
| CN | 202550940 U | 11/2012 |
| CN | 103647441 A | 3/2014 |

OTHER PUBLICATIONS

Partial English Translation and Abstract of Chinese Patent Application No. CN103647441, Nov. 6, 2015, 3 pages.
Partial English Translation and Abstract of Chinese Patent Application No. CN101854051, Feb. 27, 2016, 5 pages.
Foreign Communication From a Counterpart Application, Chinese Application No. 201310632606.2, Chinese Office Action dated Jun. 24, 2015, 7 pages.
Foreign Communication From a Counterpart Application, PCT Application No. PCT/CN2014/076861, English Translation of International Search Report dated Sep. 1, 2014, 2 pages.
Foreign Communication From a Counterpart Application, PCT Application No. PCT/CN2014/076861, Written Opinion dated Sep. 1, 2014, 5 pages.
Foreign Communication From a Counterpart Application, European Application No. 14865359.5, Extended European Search Report dated Apr. 12, 2016, 6 pages.

* cited by examiner

HIGH VOLTAGE DIRECT CURRENT SOFT-START CIRCUIT

CROSS-REFERENCE TO RELATED APPLICATIONS

This application is a continuation of International Application No. PCT/CN2014/076861, filed on May 6, 2014, which claims priority to Chinese Patent Application No. 201310632606.2, filed on Nov. 29, 2013, both of which are hereby incorporated by reference in their entireties.

TECHNICAL FIELD

The present disclosure relates to communications technologies, and in particular, to a high voltage direct current soft-start circuit.

BACKGROUND

In recent years, a high voltage direct current (HVDC) technology develops extremely rapidly in the field of communications. As the power of a communication device increases, the HVDC technology gradually shows its advantage in application. A board, a power supply module, or the like applied in a communication device needs to satisfy a requirement of hot plugging. In a device such as a board or a power supply module using the HVDC, because a high voltage direct current does not turn to zero, a connector is damaged due to an arc discharge, and even a personal safety accident or a fire due to a huge electric arc may be caused.

The device using the HVDC is connected to another apparatus by using a connector, for example, a board using the HVDC is connected to a backplane by using a connector. In the prior art, a main method used for extinguishing an arc is to improve a connector by adding an arc extinguishing function inside the connector, for example, adding a permanent magnet that can attract an electric arc.

However, the prior art increases the size of the connector, and has a particular requirement on a manufacturing material, and therefore is difficult to implement.

SUMMARY

Embodiments of the present disclosure provide a high voltage direct current soft-start circuit, to solve a problem that in order to extinguish an arc, the size of a connector is increased.

A first aspect of the embodiments of the present disclosure provides a HVDC soft-start circuit, including a drive control unit, a first switch, a second switch, a load, and a first part of a connector, where a first end of the first switch is connected to a negative electrode of a high voltage direct current, a first end of the second switch is connected to the negative electrode of the high voltage direct current, and the drive control unit is connected separately to the first switch, the second switch, and the load, where the first part of the connector is connected to the drive control unit, and upon power-on, the first part of the connector communicates with a second part of the connector, to trigger the drive control unit to drive the first switch to turn on; and the drive control unit delays a preset time after driving the first switch to turn on, drives the second switch to turn on, and drives the load to start after the second switch is turned on.

With reference to the first aspect, in a first possible implementation manner of the first aspect, the circuit further includes a power resistor and a load capacitor, where a second end of the first switch is connected to a first end of the power resistor, and a second end of the second switch is connected to a second end of the power resistor; the second end of the power resistor is connected to a first end of the load capacitor, and a second end of the load capacitor is connected to a positive electrode of the high voltage direct current; and the first end of the load capacitor is connected to a first end of the load, and the second end of the load capacitor is connected to a second end of the load.

With reference to the first possible implementation manner of the first aspect, in a second possible implementation manner of the first aspect, the first switch is a first metal oxide semiconductor (MOS) transistor, where a source electrode of the first MOS transistor is connected to the negative electrode of the high voltage direct current, a gate electrode of the first MOS transistor is connected to the drive control unit, and a drain electrode of the first MOS transistor is connected to the first end of the power resistor; and the second switch is a second MOS transistor, where a source electrode of the second MOS transistor is connected to the negative electrode of the high voltage direct current, a gate electrode of the second MOS transistor is connected to the drive control unit, and a drain electrode of the second MOS transistor is connected to the second end of the power resistor.

With reference to the first possible implementation manner of the first aspect, in a third possible implementation manner of the first aspect, the first switch is a MOS transistor, where a source electrode of the MOS transistor is connected to the negative electrode of the high voltage direct current, a gate electrode of the MOS transistor is connected to the drive control unit, and a drain electrode of the MOS transistor is connected to the first end of the power resistor; and the second switch is a relay, where a first end of the relay is connected to the negative electrode of the high voltage direct current, a second end of the relay is connected to the second end of the power resistor, and a control pin of the relay is connected to the drive control unit.

With reference to the first possible implementation manner of the first aspect, in a fourth possible implementation manner of the first aspect, the first switch is a first relay, where a first end of the first relay is connected to the negative electrode of the high voltage direct current, a second end of the first relay is connected to the first end of the power resistor, and a control pin of the first relay is connected to the drive control unit; and the second switch is a second relay, where a first end of the second relay is connected to the negative electrode of the high voltage direct current, a second end of the second relay is connected to the second end of the power resistor, and a control pin of the second relay is connected to the drive control unit.

With reference to the first possible implementation manner of the first aspect, in a fifth possible implementation manner of the first aspect, the first part of the connector includes one short pin and two long pins, where the short pin is connected to the drive control unit, one of the long pins is connected to a positive electrode pin of the second part of the connector, and the other long pin is connected to a first negative electrode pin of the second part of the connector; and the short pin is configured to, after coming into contact with a second negative electrode pin of the second part of the connector upon power-on, cause the connector to generate a connection signal and send the connection signal to the drive control unit.

With reference to the first aspect, in a sixth possible implementation manner of the first aspect, the drive control unit is connected separately to a positive electrode and the negative electrode of the high voltage direct current.

The HVDC soft-start circuit provided in the embodiments of the present disclosure implements that, after a first part of a connector is hot-plugged, a drive control unit is triggered to drive a first switch to turn on, that is, no electric arc will be generated during the plugging; and when the first part of the connector is hot-unplugged, the first part of the connector is disconnected from a second part of the connector, the drive control unit then controls the first switch and a second switch to turn off instantly, and at this time, no current passes through a contact part between the first part of the connector and the second part of the connector. As a result, the connector can be unplugged without generating an electric arc, thereby avoiding generating an arc discharge, and implementing arc-free hot plugging of a HVDC power supply apparatus. Moreover, no improvement needs to be made to the connector itself, such that the connector has a relatively small size and can be used in a case of limited space.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
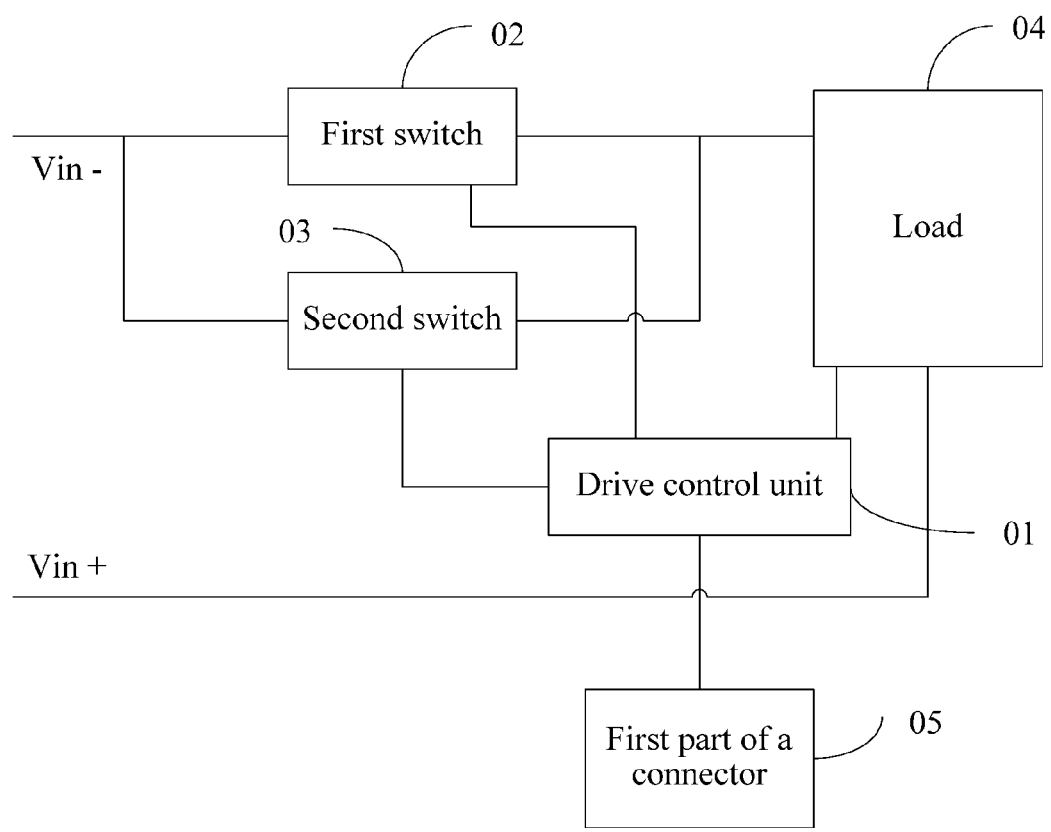
FIG. 1 is a schematic structural diagram of Embodiment 1 of a HVDC current soft-start circuit according to the present disclosure.

FIG. 1 is a schematic structural diagram of Embodiment 1 of a HVDC soft-start circuit according to the present disclosure. The circuit may be deployed on an apparatus such as a board or a power supply module, and is connected to a backplane or another apparatus using a connector. It should be noted that the connector is divided into two parts, where a first part belongs to the circuit provided in this embodiment of the present disclosure, a second part belongs to a backplane or another apparatus corresponding to the circuit of the present disclosure, and communication is implemented by inserting the first part of the connector into the second part.

As shown in FIG. 1, the circuit includes a drive control unit 01, a first switch 02, a second switch 03, a load 04, and a first connector part 05, where a first end of the first switch 02 is connected to a negative electrode (Vin−) of a high voltage direct current, a first end of the second switch 03 is also connected to the negative electrode (Vin−) of the high voltage direct current, and the drive control unit 01 is connected separately to the first switch 02, the second switch 03, and the load 04.

The first connector part 05 is connected to the drive control unit 01, and upon power-on, the first connector part 05 communicates with a second part of the connector, to trigger the drive control unit 01 to drive the first switch 02 to turn on. That is, when an apparatus in which the foregoing circuit is located is powered on by inserting the first connector part 05 into an apparatus in which the second part of the connector is located, the first connector part 05 communicates with the second part of the connector, a signal is generated when the first connector part 05 communicates with the second part of the connector, and the signal is sent to the drive control unit 01, to trigger the drive control unit 01 to drive the first switch 02 to turn on.

The drive control unit 01 delays a preset time after driving the first switch 02 to turn on, drives the second switch 03 to turn on, and drives the load 04 to start after the second switch 03 is turned on, such that the start of the load is implemented. Until now, soft start of the high voltage direct current is completed, which implements that no electric arc is generated when the first connector part 05 of the HVDC soft-start circuit is hot-plugged.

Assuming that the foregoing circuit is deployed on a board using the high voltage direct current, when the board is hot-unplugged, the first connector part 05 is disconnected from the second part of the connector, and at this time, the connector generates a disconnection signal and sends the disconnection signal to the drive control unit 01, such that the drive control unit 01 controls the first switch 02 and the second switch 03 to turn off instantly. At this time, no current passes through a contact part between the first connector part 05 and the second part of the connector, thereby implementing that the connector is disconnected without generating an electric arc, and avoiding generating an arc discharge.

In this embodiment of the present disclosure, arc-free hot plugging of a HVDC power supply apparatus is implemented using the foregoing circuit. Moreover, no improvement needs to be made to the connector itself, such that the connector has a relatively small size and can be used in a case of limited space.

Figure 2:
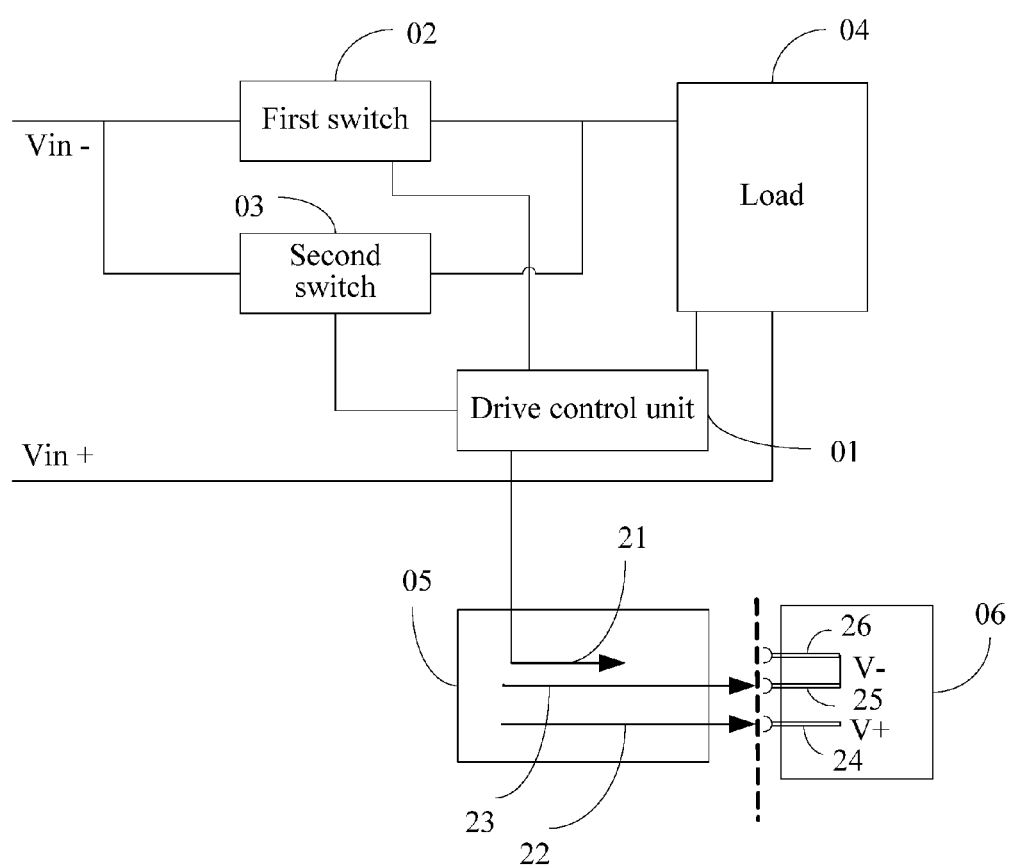
FIG. 2 is a schematic structural diagram of Embodiment 2 of a HVDC soft-start circuit according to the present disclosure.

FIG. 2 is a schematic structural diagram of Embodiment 2 of a HVDC soft-start circuit according to the present disclosure. As shown in FIG. 2, based on FIG. 1, the first connector part 05 includes a short pin 21 and two long pins 22 and 23, where the short pin 21 is connected to the drive control unit 01, the long pin 22 is connected to a positive electrode pin 24 of a second connector part 06, and the other long pin 23 is connected to a first negative electrode pin 25 of the second connector part 06.

The short pin 21 is configured to, after coming into contact with a second negative electrode pin 26 of the second connector part 06 upon power-on, cause the connector to generate a connection signal and send the connection signal to the drive control unit 01.

The connector in this embodiment uses a control manner of long and short pins, where a long pin is used as a power supply pin, and a short pin is used as a signal pin. When the first connector part 05 is inserted into the second connector part 06, the two long pins 22 and 23 are first connected to the positive electrode pin 24 and the first negative electrode pin 25 respectively, and after the short pin 21 is in contact with the second negative electrode pin 26, the first connector part 05 is in complete communication with the second connector part 06, and the connector generates the connection signal and sends the connection signal to the drive control unit 01, to trigger the drive control unit 01 to drive the first switch 02 to turn on.

When the first connector part 05 is hot-unplugged, the short pin 21 is first disconnected from the second negative electrode pin 26, and the connector generates a disconnection signal and sends the disconnection signal to the drive control unit 01, such that the drive control unit 01 controls the first switch 02 and the second switch 03 to turn off instantly, and at this time, no current passes through a contact part between the long pin 22 and the positive electrode pin 24 and a contact part between the long pin 23 and the first negative electrode pin 25.

In an implementation process, if the connector does not use the manner of long and short pins, alternatively, an interlock micro control switch may be installed and connected to the drive control unit 01. After the first connector part 05 is inserted into the second connector part 06, the interlock micro control switch is turned on to trigger the drive control unit 01 to drive the first switch 02 to turn on. Provided that the interlock micro control switch is turned on, the first connector part 05 cannot be unplugged from the second connector part 06. Before the first connector part 05 is unplugged, the interlock micro control switch is turned off to trigger the drive control unit 01 to control the first switch 02 and the second switch 03 to turn off instantly, and then the first connector part 05 is unplugged. Arc-free hot plugging of a high voltage direct current power supply apparatus can also be implemented in this manner, and no improvement needs to be made to the connector itself.

Figure 3:
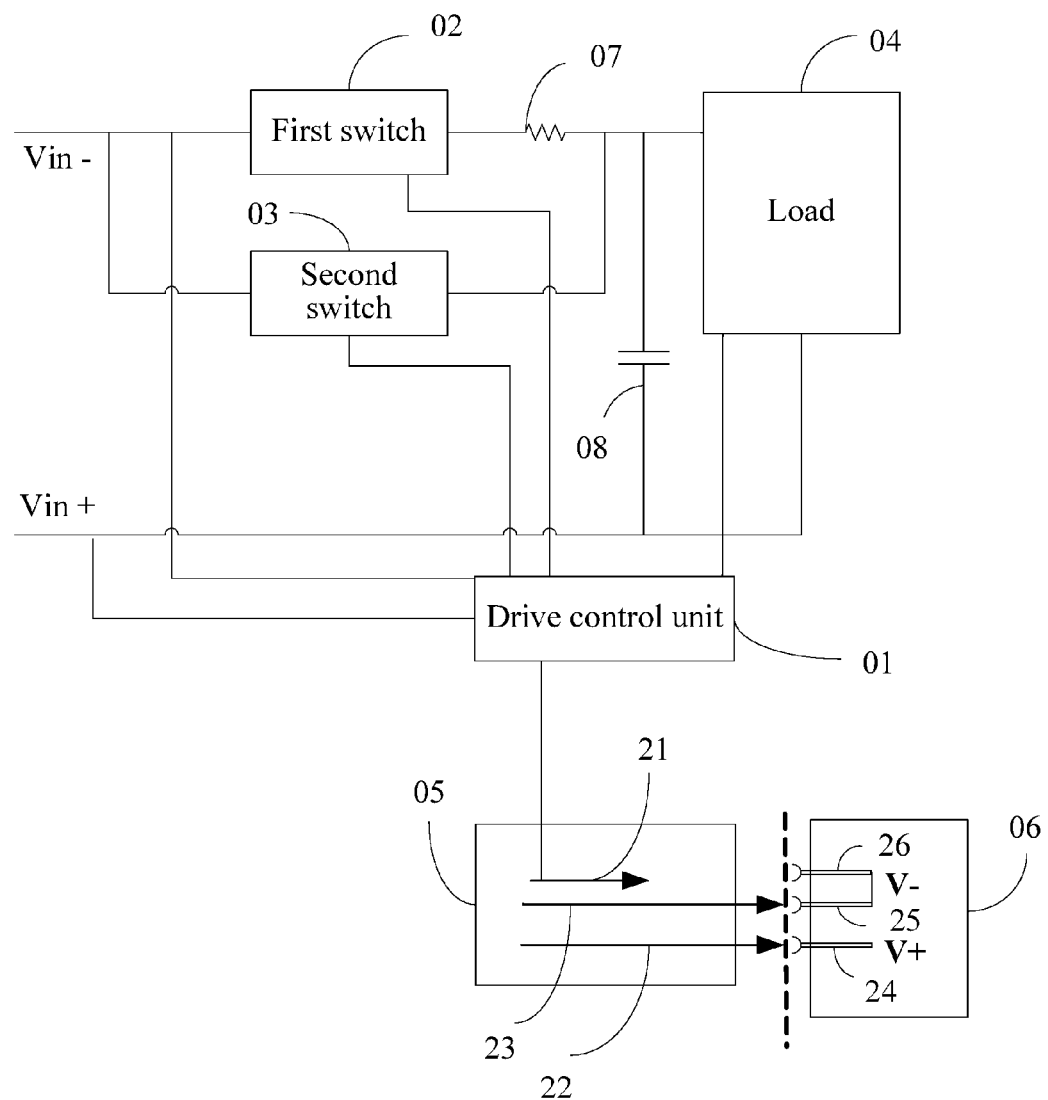
FIG. 3 is a schematic structural diagram of Embodiment 3 of a HVDC soft-start circuit according to the present disclosure.

FIG. 3 is a schematic structural diagram of Embodiment 3 of a HVDC soft-start circuit according to the present disclosure. As shown in FIG. 3, based on the foregoing embodiments, the foregoing circuit further includes a power resistor (R) 07 and a load capacitor (C) 08. A second end of the first switch 02 is connected to a first end of the power resistor 07, and a second end of the second switch 03 is connected to a second end of the foregoing power resistor 07; a second end of the power resistor 07 is connected to a first end of the load capacitor 08, and a second end of the load capacitor 08 is connected to the positive electrode (Vin+) of the high voltage direct current; and the first end of the load capacitor 08 is connected to a first end of the load 04, and the second end of the load capacitor 08 is connected to a second end of the load 04.

In an implementation process, the drive control unit 01 delays a preset time after driving the first switch 02 to turn on, where the preset time is determined according to values of R and C. It should be noted that after the first switch 02 is turned on, in the circuit, the load capacitor 08 is recharged using the power resistor 07. After a certain period of time, the recharging of the load capacitor 08 is completed, and at this time, a voltage difference between two ends of the second switch 03 is 0. The drive control unit 01 drives, after the preset time and when the recharging of the load capacitor 08 is completed, the second switch 03 to turn on.

Still referring to FIG. 3, the drive control unit 01 is connected separately to the positive electrode and the negative electrode of the high voltage direct current, so as to implement auxiliary power supply for the drive control unit 01.

Figure 4:
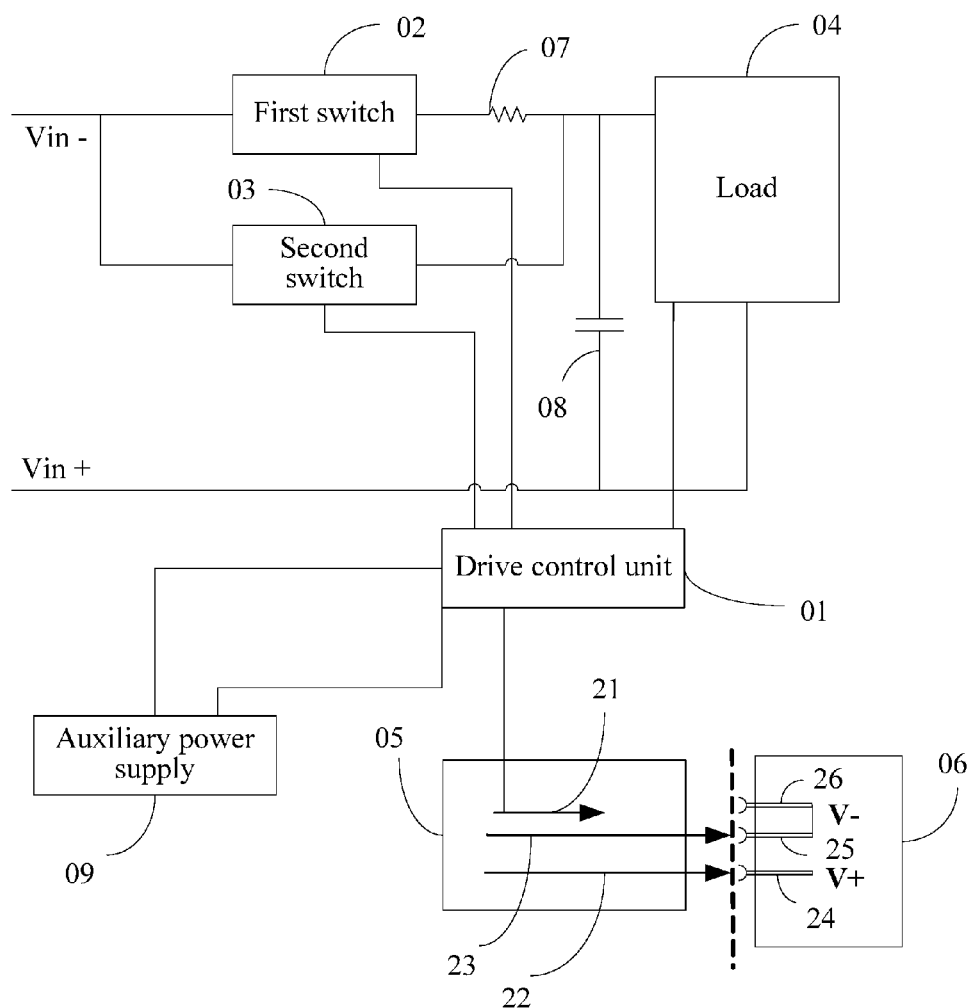
FIG. 4 is a schematic structural diagram of Embodiment 4 of a HVDC soft-start circuit according to the present disclosure.

FIG. 4 is a schematic structural diagram of Embodiment 4 of a HVDC soft-start circuit according to the present disclosure, which differs from FIG. 3 in that another auxiliary power supply may be used to assist in supplying power to the drive control unit 01, without using a high voltage direct current for auxiliary power supply. Referring to FIG. 4, the drive control unit 01 is connected to an auxiliary power supply 09, and the auxiliary power supply 09 assists in supplying power to the drive control unit 01. Preferably, the auxiliary power supply 09 may be a power supply on an apparatus in which a second connector part 06 is located. For example, the second connector part 06 is on a backplane. A plurality of second parts of connectors may be installed on one backplane. That is, one backplane may have a plurality of auxiliary power supplies for supplying power to boards, and in this case, an auxiliary power supply for supplying power to another board may be used to assist in supplying power to the drive control unit 01 in the foregoing circuit.

The first switch 02 and the second switch 03 have a plurality of implementation manners. For details, reference may be made to the description below.

Figure 5:
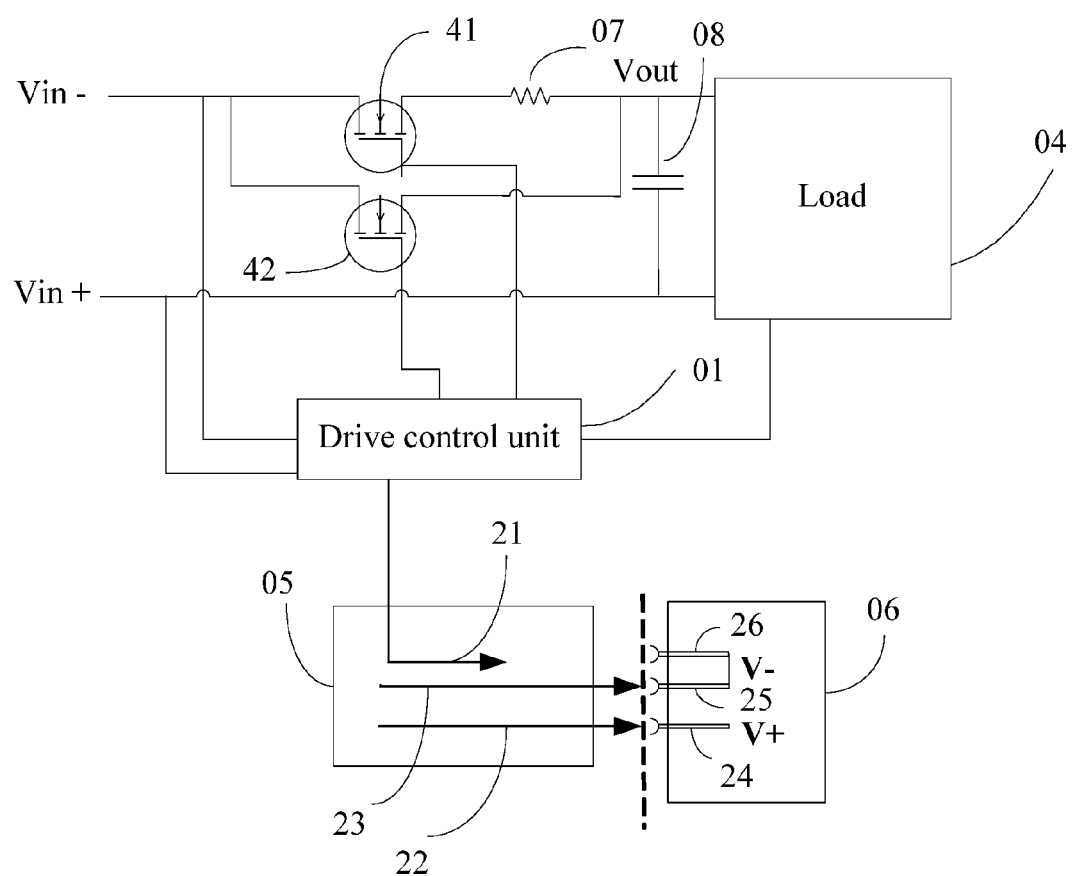
FIG. 5 is a schematic structural diagram of Embodiment 5 of a HVDC soft-start circuit according to the present disclosure.

FIG. 5 is a schematic structural diagram of Embodiment 5 of a HVDC soft-start circuit according to the present disclosure. As shown in FIG. 5, the first switch 02 and the second switch 03 both may be MOS transistors. Specifically, the first switch is a first MOS transistor 41, where a source electrode of the first MOS transistor 41 is connected to a negative electrode of a high voltage direct current, a gate electrode of the first MOS transistor 41 is connected to the drive control unit 01, and a drain electrode of the first MOS transistor 41 is connected to a first end of the power resistor 07. The second switch is a second MOS transistor 42, where a source electrode of the second MOS transistor 42 is connected to the negative electrode of the high voltage direct current, a gate electrode of the second MOS transistor 42 is connected to the drive control unit 01, and a drain electrode of the second MOS transistor 42 is connected to a second end of the power resistor 07.

For an implementation process, reference may be made to the foregoing embodiments, and details are not described herein again.

Figure 6:
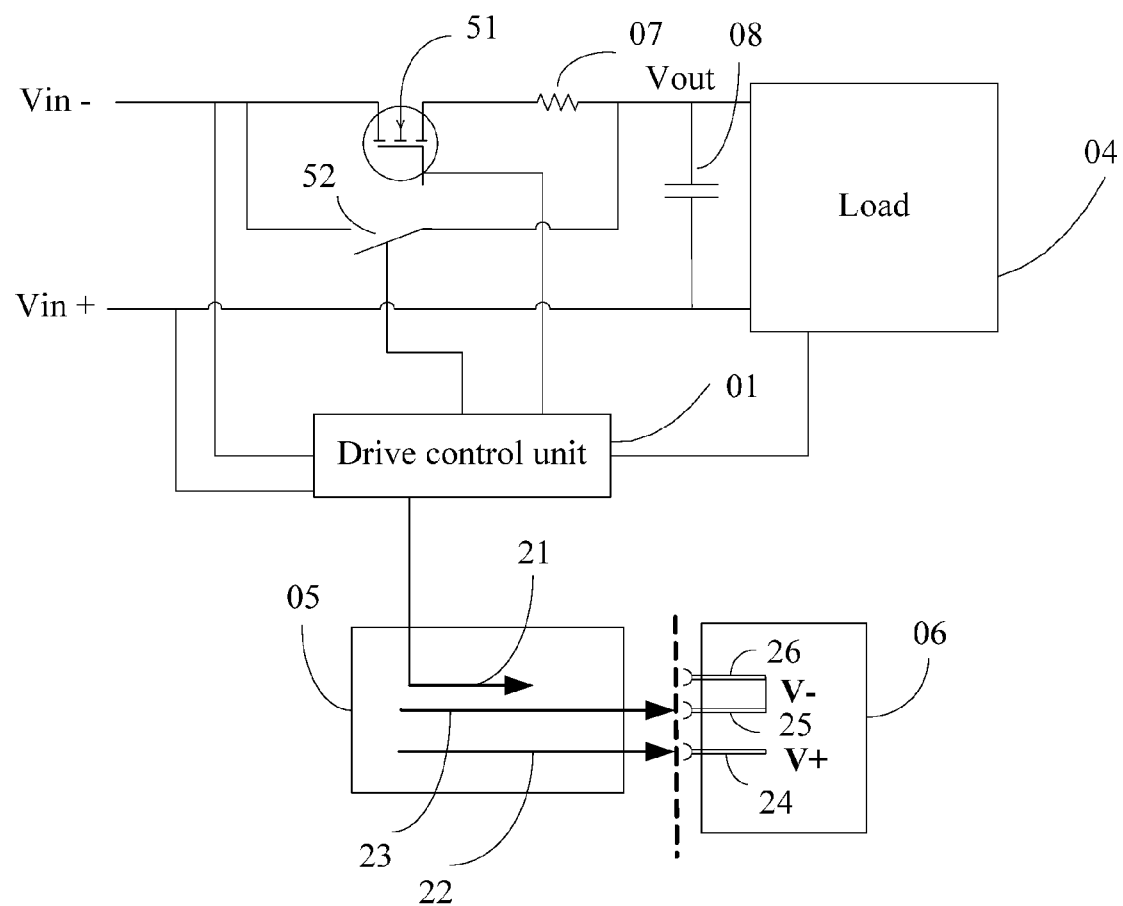
FIG. 6 is a schematic structural diagram of Embodiment 6 of a HVDC soft-start circuit according to the present disclosure.

FIG. 6 is a schematic structural diagram of Embodiment 6 of a HVDC soft-start circuit according to the present disclosure, which differs from the embodiment shown in FIG. 5 in that the foregoing second MOS transistor may be replaced with a relay. Specifically, the first switch is a MOS transistor 51, a source electrode of the MOS transistor 51 is connected to a negative electrode of the high voltage direct current, a gate electrode of the MOS transistor 51 is connected to the drive control unit 01, and a drain electrode of the MOS transistor 51 is connected to a first end of the power resistor 07. The second switch is a relay 52, where a first end of the relay 52 is connected to the negative electrode of the high voltage direct current, a second end of the relay 52 is connected to a second end of the power resistor 07, and a control pin of the relay 52 is connected to the drive control unit 01.

For an implementation process, reference may be made to the foregoing embodiments, and details are not described herein again. Extensibly, the second MOS transistor in the embodiment of FIG. 5 may also be replaced with a relay, and an implementation manner thereof is the same.

Figure 7:
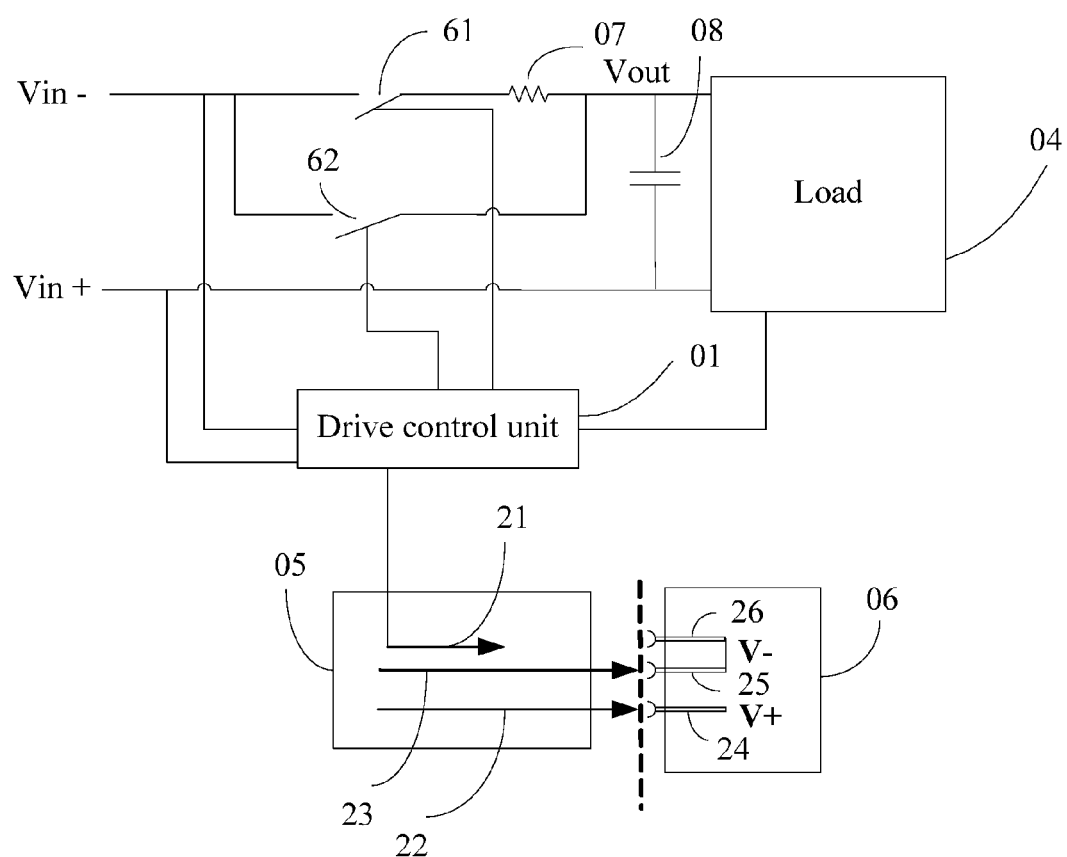
FIG. 7 is a schematic structural diagram of Embodiment 7 of a HVDC soft-start circuit according to the present disclosure.

FIG. 7 is a schematic structural diagram of Embodiment 7 of a HVDC soft-start circuit according to the present disclosure, which differs from the foregoing embodiments in that a first switch and a second switch both are relays. Specifically, the first switch is a first relay 61, where a first end of the first relay 61 is connected to the negative electrode of the high voltage direct current, a second end of the first relay 61 is connected to a second end of the power resistor 07, and a control pin of the first relay 61 is connected to the drive control unit 01. The second switch is a second relay 62, where a first end of the second relay 62 is connected to the negative electrode of the high voltage direct current, a second end of the second relay 62 is connected to the second end of the power resistor 07, and a control pin of the second relay 62 is connected to the drive control unit 01.

The HVDC soft-start circuit provided in the embodiments of the present disclosure has a wide application range. For example, the HVDC soft-start circuit may be applied on an apparatus such as a board or a power supply module, but is not limited thereto. In the embodiment of the present disclosure, arc-free hot plugging of a HVDC power supply apparatus is implemented using the foregoing circuit. Moreover, no improvement needs to be made to the connector itself, such that the connector has a relatively small size and can be used in a case of limited space.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disc, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A high voltage direct current soft-start circuit, comprising:
   a drive control unit;
   a first switch;
   a second switch;
   a load; and
   a connector having a first connector part and a second connector part,
   wherein a first end of the first switch is connected to a negative electrode of a high voltage direct current, a first end of the second switch is connected to the negative electrode of the high voltage direct current, and the drive control unit is connected separately to the first switch, the second switch, and the load, wherein the first connector part is connected to the drive control unit, wherein upon power-on, the first connector part communicates with the second connector part to trigger the drive control unit to drive the first switch to turn on, and wherein the drive control unit delays a preset time after driving the first switch to turn on, drives the second switch to turn on, and drives the load to start after the second switch is turned on.

2. The circuit according to claim 1, further comprising:
   a power resistor; and
   a load capacitor,
   wherein a second end of the first switch is connected to a first end of the power resistor, and a second end of the second switch is connected to a second end of the power resistor, wherein the second end of the power resistor is connected to a first end of the load capacitor, and a second end of the load capacitor is connected to a positive electrode of the high voltage direct current, and wherein the first end of the load capacitor is connected to a first end of the load, and the second end of the load capacitor is connected to a second end of the load.

3. The circuit according to claim 2, wherein the first switch is a first metal oxide semiconductor (MOS) transistor, wherein a source electrode of the first MOS transistor is connected to the negative electrode of the high voltage direct current, a gate electrode of the first MOS transistor is connected to the drive control unit, and a drain electrode of the first MOS transistor is connected to the first end of the power resistor, wherein the second switch is a second MOS transistor, and wherein a source electrode of the second MOS transistor is connected to the negative electrode of the high voltage direct current, a gate electrode of the second MOS transistor is connected to the drive control unit, and a drain electrode of the second MOS transistor is connected to the second end of the power resistor.

4. The circuit according to claim 2, wherein the first switch is a MOS transistor, wherein a source electrode of the MOS transistor is connected to the negative electrode of the high voltage direct current, a gate electrode of the MOS transistor is connected to the drive control unit, and a drain electrode of the MOS transistor is connected to the first end of the power resistor, and wherein the second switch is a relay, wherein a first end of the relay is connected to the negative electrode of the high voltage direct current, a second end of the relay is connected to the second end of the power resistor, and a control pin of the relay is connected to the drive control unit.

5. The circuit according to claim 2, wherein the first switch is a first relay, wherein a first end of the first relay is connected to the negative electrode of the high voltage direct current, a second end of the first relay is connected to the first end of the power resistor, and a control pin of the first relay is connected to the drive control unit, and wherein the second switch is a second relay, wherein a first end of the second relay is connected to the negative electrode of the high voltage direct current, a second end of the second relay is connected to the second end of the power resistor, and a control pin of the second relay is connected to the drive control unit.

6. The circuit according to claim 2, wherein the first connector part comprises:
   one short pin connected to the drive control unit;
   a first long pin connected to a positive electrode pin of the second connector part; and a second long pin connected to a first negative electrode pin of the second connector part, wherein the short pin is configured to, after coming into contact with a second negative electrode pin of the second connector part upon power-on, cause the connector to generate a connection signal and send the connection signal to the drive control unit.

7. The circuit according to claim 1, wherein the drive control unit is connected separately to a positive electrode and the negative electrode of the high voltage direct current.

* * * * *